(12) United States Patent
Wu

(10) Patent No.: US 8,733,857 B2
(45) Date of Patent: May 27, 2014

(54) ELECTRONIC DEVICE WITH BEZEL ASSEMBLY

(75) Inventor: Zhi-Ping Wu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 27 days.

(21) Appl. No.: 13/553,933

(22) Filed: Jul. 20, 2012

(65) Prior Publication Data

US 2013/0147326 A1 Jun. 13, 2013

(30) Foreign Application Priority Data

Dec. 12, 2011 (CN) .......................... 2011 1 0411743

(51) Int. Cl.
*A47B 81/00* (2006.01)

(52) U.S. Cl.
USPC .................................... 312/223.2; 312/265.5

(58) Field of Classification Search
USPC ............. 312/223.2, 265.5, 265.6; 292/80, 81, 292/87, 95, 96, 101, DIG. 11, DIG. 38
See application file for complete search history.

(56) References Cited

U.S. PATENT DOCUMENTS

| | | | | |
|---|---|---|---|---|
| 5,542,757 A * | 8/1996 | Chang | ......................... | 312/223.2 |
| 6,102,501 A * | 8/2000 | Chen et al. | ................... | 312/223.2 |
| 6,234,593 B1 * | 5/2001 | Chen et al. | ................... | 312/223.2 |
| 6,296,333 B1 * | 10/2001 | Lee et al. | ..................... | 312/223.2 |
| 6,375,287 B1 * | 4/2002 | Lai | .............................. | 312/223.2 |
| 6,899,407 B1 * | 5/2005 | Lai | ............................... | 312/223.2 |
| 7,009,845 B2 * | 3/2006 | Chen et al. | .................... | 361/726 |
| 7,377,602 B2 * | 5/2008 | Chen et al. | ................. | 312/223.2 |
| 7,609,516 B2 * | 10/2009 | Chen et al. | ................. | 361/679.6 |
| 8,382,214 B2 * | 2/2013 | Tang | ........................... | 312/223.2 |
| 8,410,358 B2 * | 4/2013 | Chen et al. | ...................... | 174/50 |
| 8,482,913 B2 * | 7/2013 | Huang et al. | ............. | 361/679.33 |
| 8,505,986 B2 * | 8/2013 | Sun | .............................. | 292/80 |
| 8,573,717 B2 * | 11/2013 | Liu et al. | .................... | 312/223.2 |
| 2005/0116588 A1 * | 6/2005 | Teng | ......................... | 312/223.2 |
| 2005/0206281 A1 * | 9/2005 | Wen-Lung | ................. | 312/265.5 |
| 2007/0013277 A1 * | 1/2007 | Lin et al. | ..................... | 312/223.2 |
| 2008/0024969 A1 * | 1/2008 | Sun et al. | ....................... | 361/683 |
| 2008/0239646 A1 * | 10/2008 | Chen et al. | ..................... | 361/683 |
| 2011/0279972 A1 * | 11/2011 | Xue | .......................... | 361/679.57 |
| 2012/0002352 A1 * | 1/2012 | Hsiung | .................... | 361/679.01 |
| 2013/0058047 A1 * | 3/2013 | Chen | ............................. | 361/724 |
| 2013/0099635 A1 * | 4/2013 | Wu | ............................ | 312/223.1 |

FOREIGN PATENT DOCUMENTS

TW M247887 10/2004
TW M254635 1/2005

* cited by examiner

*Primary Examiner* — Daniel Rohrhoff
(74) *Attorney, Agent, or Firm* — Novak Druce Connolly Bove + Quigg LLP

(57) ABSTRACT

A bezel assembly includes a panel, a shielding member, and a securing member. The panel includes a main body. The main body defines a through hole and a first opening. The shielding member attached to the panel includes a mounting portion. A second opening is defined in the shielding member, and the first opening and the second opening are configured to a data storage extend through to abut the first opening. The securing member secured to the panel includes a latching piece with a cutout. The securing member is slidable relative to the main body between a first position and a second position; when the securing member is in the first position, the mounting portion extends through the through hole to engage with the latching piece; when the securing member is in the second portion, the mounting portion is located on the cutout to disengage from the latching piece.

14 Claims, 6 Drawing Sheets

ELECTRONIC DEVICE WITH BEZEL ASSEMBLY

BACKGROUND

1. Technical Field

The present disclosure relates to electronic devices, and more particularly to an electronic device with a bezel assembly.

2. Description of Related Art

A computer case panel defines an opening for moving an optical disk drive in or out of the computer case. A decorating plate and a shielding plate are used to shield the opening. The decorating plate is secured to an interior of the shielding plate with a plurality of clipping members. When the shielding plate needs to be maintained or disassembled, the clipping members are disengaged from the decorating plate after the decorating plate is disengaged from the computer case. Thus, disassembly of the shielding plate may be laborious and time-consuming. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
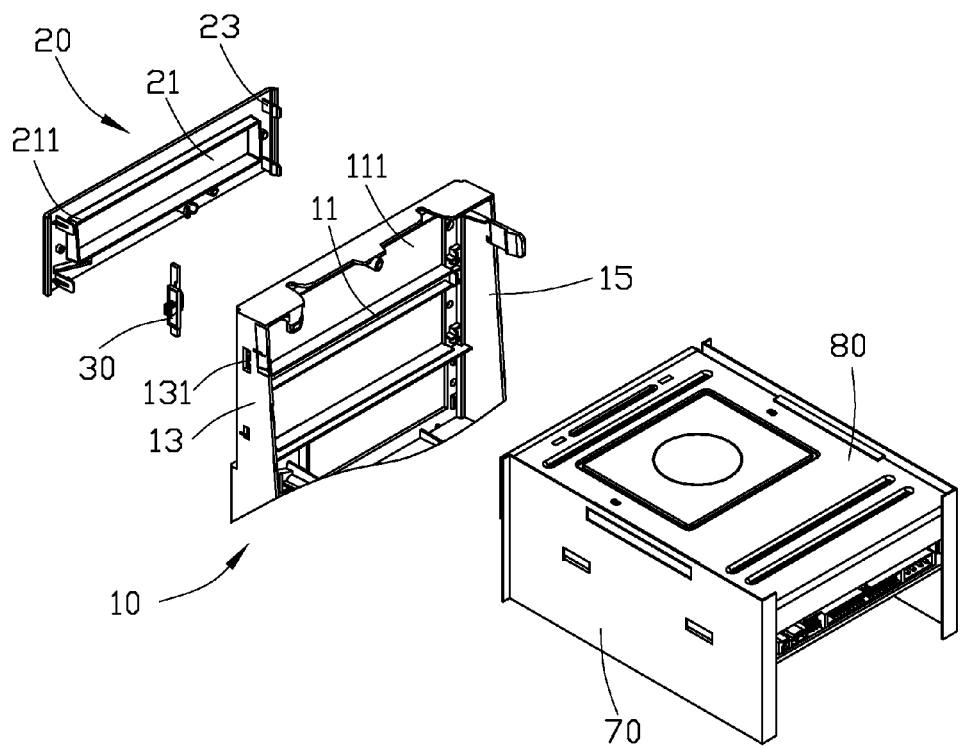
FIG. 1 is an exploded, isometric view of a bezel assembly, a securing member, a tray and an optical disk drive in accordance with an embodiment.

FIG. 1 shows an electronic device in accordance with an embodiment. The electronic device includes a bezel assembly with a panel 10 and a shielding member 20, a securing member 30, a tray 70, and an optical disk drive 80. In one embodiment, the panel 10 is a decorating panel of a computer case.

The panel 10 includes a main body 11 and a flange 13 extending from an edge of the main body 11. In one embodiment, the flange 13 is substantially perpendicular to the main body 11. The main body 11 defines a first opening 111 and a plurality of through holes 113 around the first opening 111. The first opening 111 is used for receiving the optical disk drive 80. The flange 13 defines a retaining slot 131. A protrusion 132 is located on a middle of the retaining slot 131. A sliding way 115 is defined in the main body 11 adjacent to the flange 13.

The shielding member 20 defines a second opening 21, and a plurality of mounting portions 23 around the second opening 21. A rectangle frame 211 extends from the second opening 21 and is configured to abut the first opening 111. In one embodiment, each of the mounting portions 23 is a hook, positioned substantially perpendicular to the shielding member 20.

Figure 2:
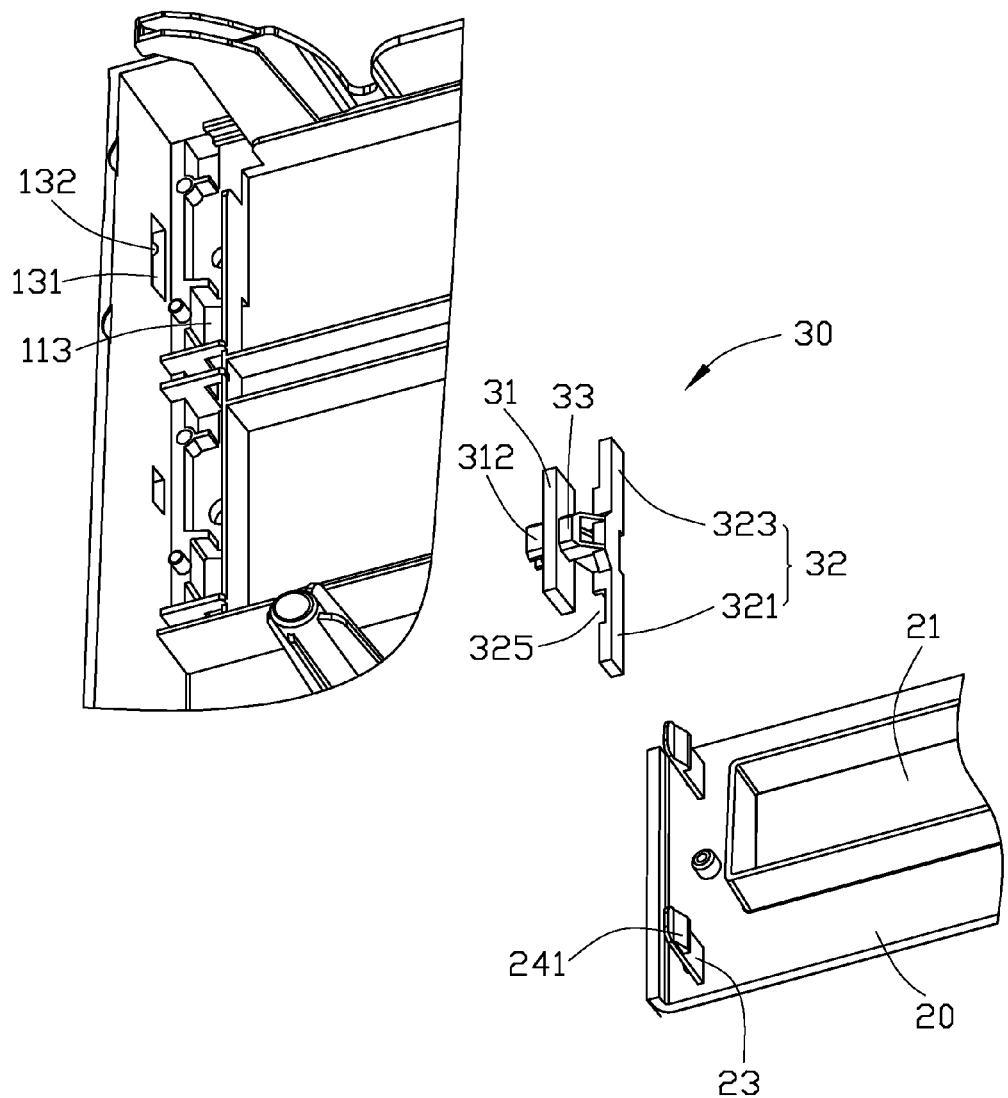
FIG. 2 is an exploded, isometric view of the bezel assembly and the securing member of FIG. 1.
Figure 3:
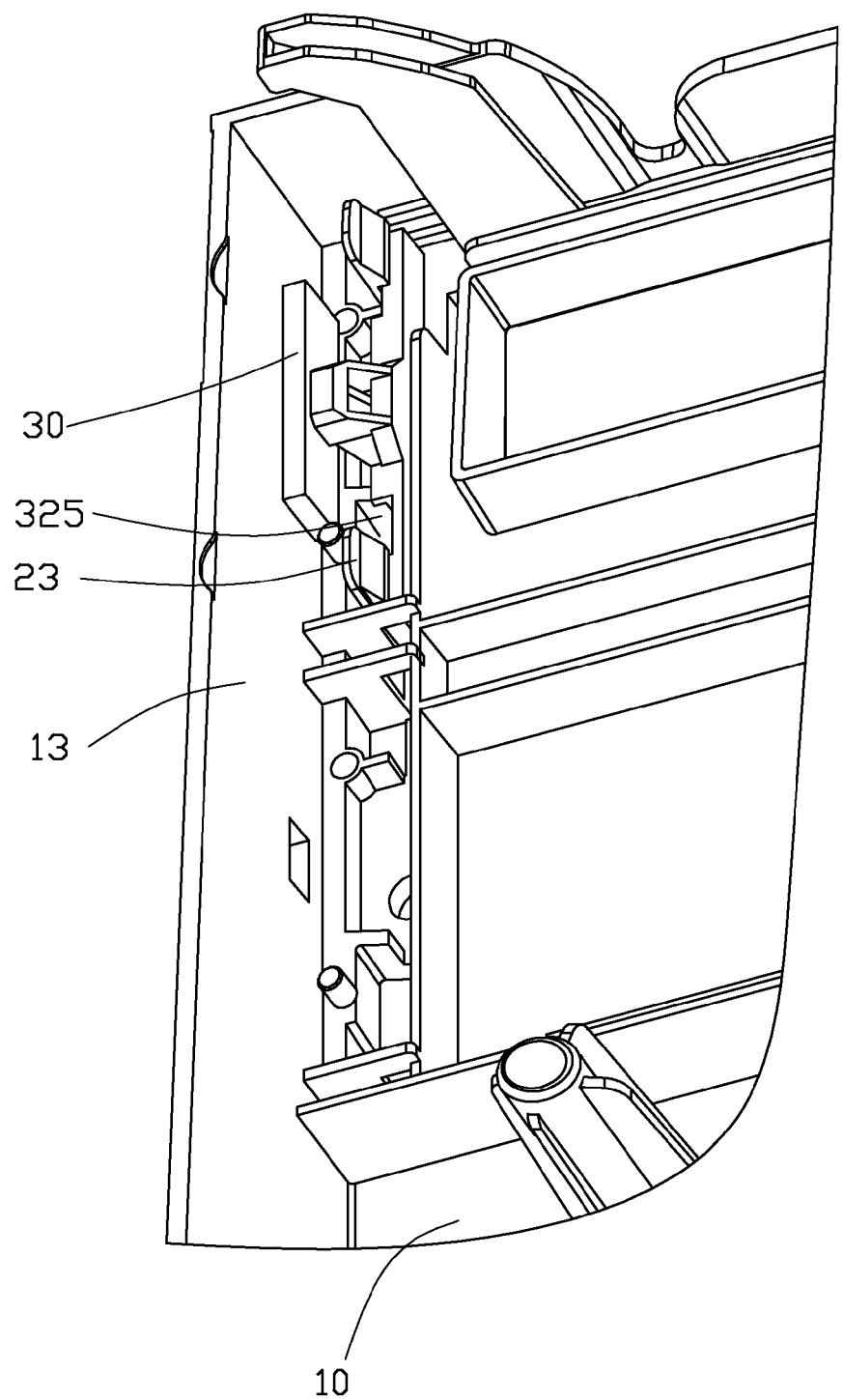
FIG. 3 is an assembled view of FIG. 2, but the shielding member is engaged with the securing member.
Figure 4:
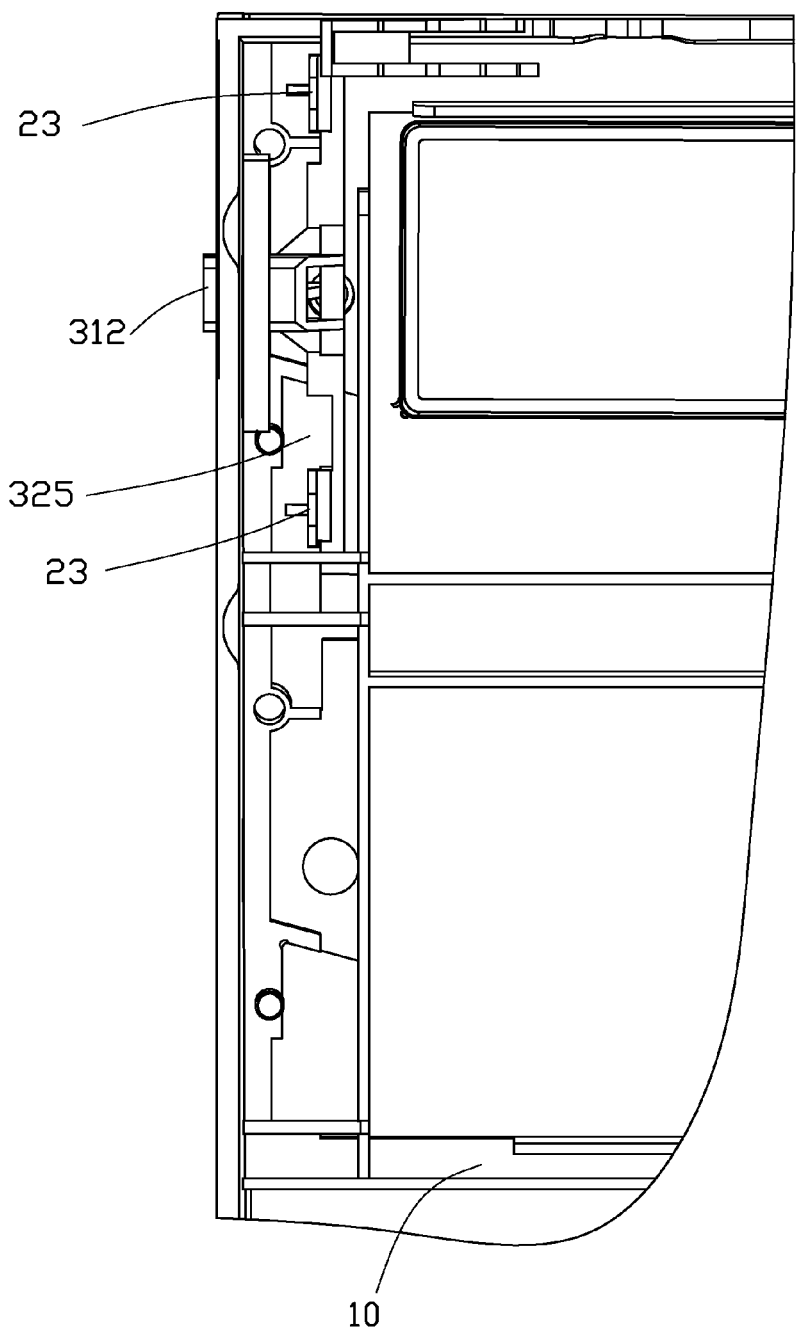
FIG. 4 is similar to FIG. 3, but viewed from a different aspect.
Figure 5:
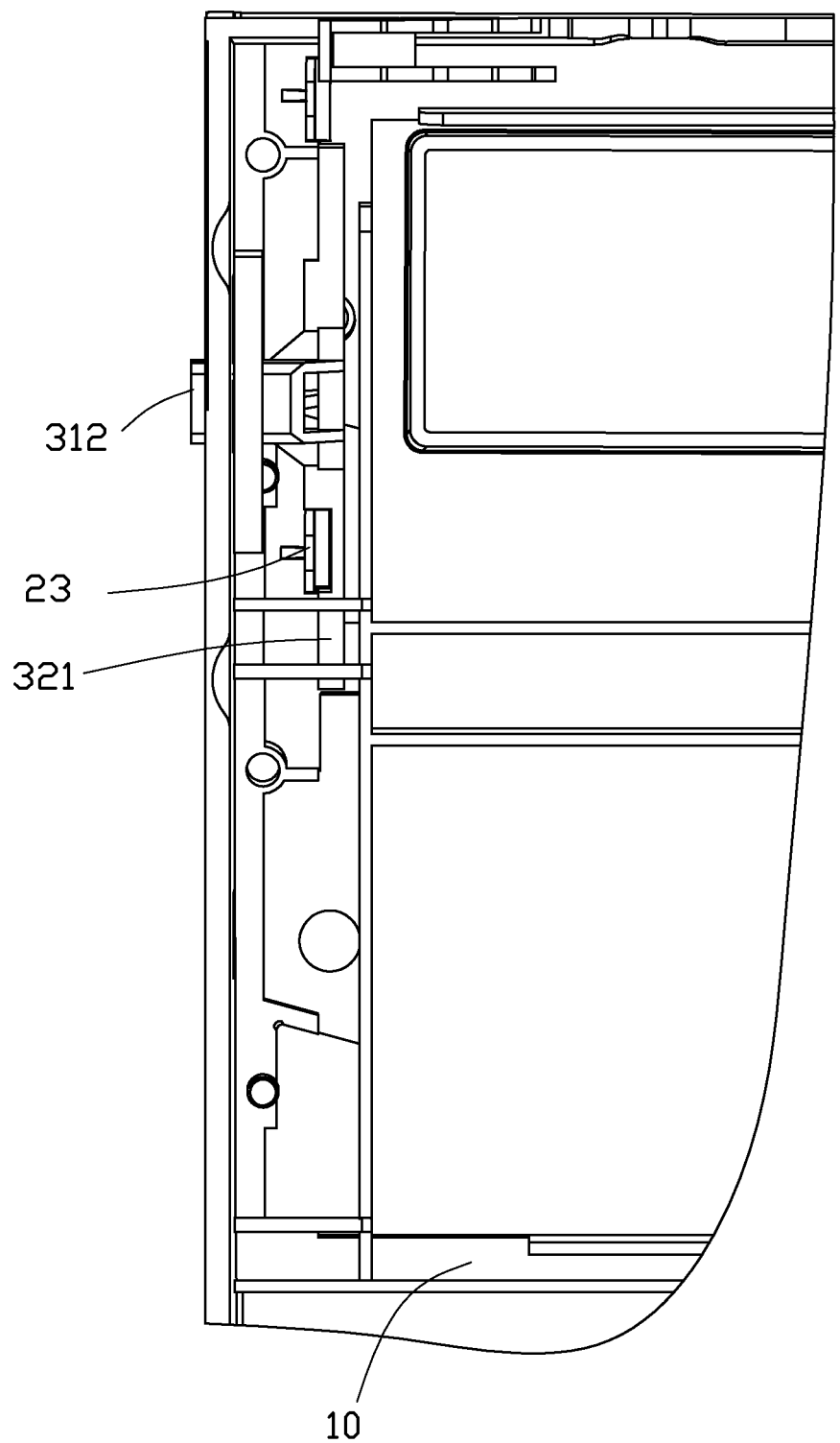
FIG. 5 is an assembled view of FIG. 2, but the shielding member is disengaged from the securing member.
Figure 6:
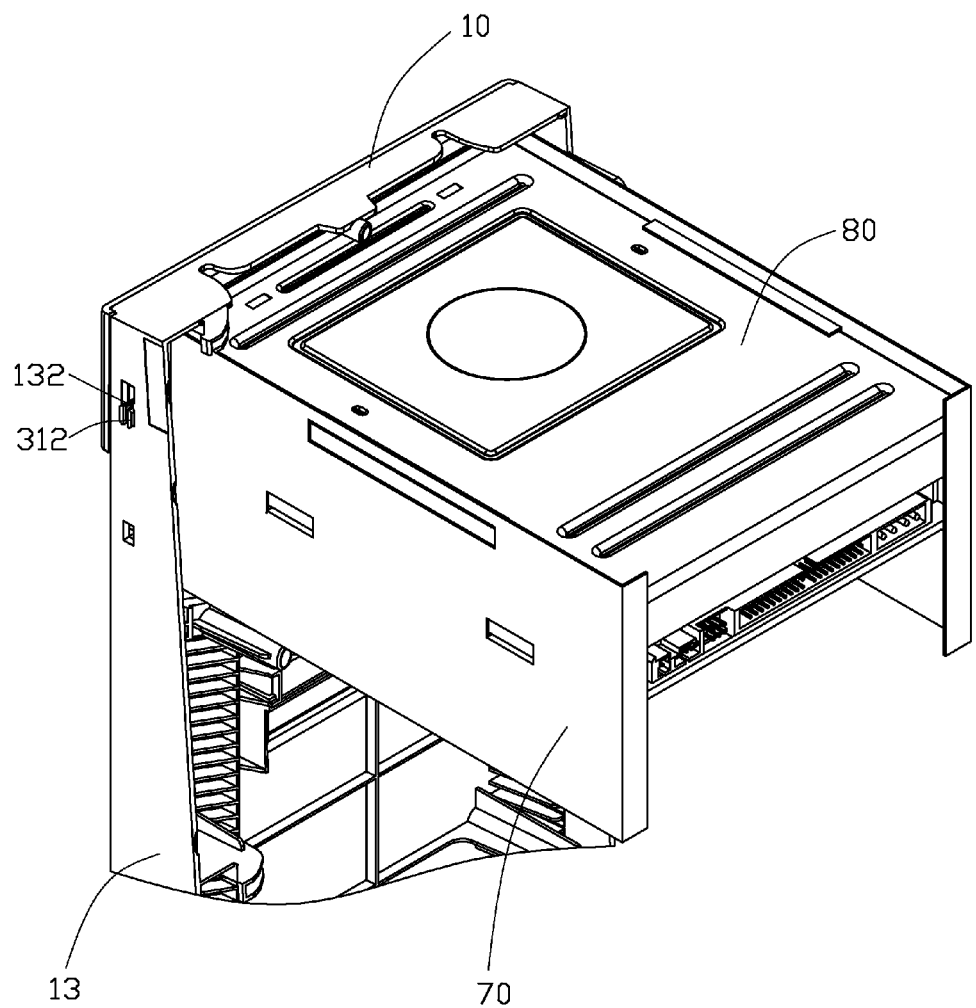
FIG. 6 is an assembled view of FIG. 1.

FIG. 2, illustrates the securing member 30 of one embodiment. The securing member 30 includes a guide piece 31, a latching piece 32, and a connection portion 33 connecting the guide piece 31 with the latching piece 32. The guide piece 31 is substantially parallel to the latching piece 32. The connecting portion 33 is located on a first side of the guide piece 31, and a drawing portion 312 are located on a second side opposite to the first side of the guide piece 31. The drawing portion 312 is elastically deformed. A size of the drawing portion 312 is smaller than a size of the retaining slot 131, and a size of the guide piece 31 is greater than a size of the retaining slot 131. The latching piece 32 includes a first latch portion 321 and a second latch portion 323 connecting the first latch portion 321. The first latch portion 321 is located below the connecting portion 33, and the second latch portion 323 is located above the connecting portion 33. A cutout 325 is defined in the first latch portion 321.

FIGS. 3-6, illustrate that in assembly of the securing member 30 of one embodiment. The latching piece 31 is received in the slide way 115, and the drawing portion 312 is inserted into the retaining slot 131 from an inner side of the flange 13, until the guide piece 31 abuts inner surfaces of the flange 13. The drawing portion 312 is slid in the retaining slot 131, until the protrusion 132 resists an upper edge of the drawing portion 312 to prevent the drawing portion 312 from sliding freely in the retaining hole. The cutout 325 is aligned with one of the through holes 113.

The tray 70 is secured to the computer enclosure (not shown) and is located on a back side of the panel 10. The optical disk drive 80 is pushed into the tray 70 through the first opening 111 from a front side of the panel 10. The shielding member 20 is aligned with the first opening 111, and each of the plurality of the mounting members 23 is inserted into each of the plurality of through holes 113. One of the mounting members 23 is aligned with the cutout 235 and is received in the cutout 325. The other mounting members 23 are staggered with the second latch portions 323. The drawing portion 312 is operated until elastically deformed allowing disengagement from the protrusion 132. The securing member 30 is moved in a first direction that is substantially parallel to the main body 11, until the mounting members 23 are engaged with the first latch portion 321 and the second latch portion 323 to secure the shielding member to the panel 10. The drawing portion 312 releases, and the protrusion 132 resists the drawing portion 312 to prevent the drawing portion 312 from sliding along the first direction. Thus, the shielding member 20 blocks the optical disk drive 80 to prevent the optical disk drive 80 from disengaging from the tray 70 through the first opening 111.

In disassembly of the shielding member 20, the drawing portion 312 is operated to be elastically deformed to disengage from the protrusion 132. The securing member 30 is pushed to slide along a second direction opposite to the first direction, until the mounting member 23 is aligned with the cutout 325, and another one of the mounting members 23 is staggered with the second latch portion 323. Thus, the shielding member 20 is detached easily from the panel 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A bezel assembly comprising:
   a panel, the panel comprising a main body, the main body defines a through hole and a first opening;
   a shielding member, attached to the panel and comprising a mounting portion; a second opening being defined in the shielding member; and the first opening and the second opening being configured to receive a data storage device extending through and abutting the first opening, and
   a securing member, secured to the panel and comprising a latching piece; a cutout being defined in the latching piece;
   wherein the securing member is slidable relative to the main body between a first position and a second position; when the securing member is in the first position, the mounting portion extends through the through hole to engage with the latching piece; when the securing member is in the second position, the mounting portion is located on the cutout to disengage from the latching piece;
   the panel further comprises a flange substantially perpendicularly connected to the main body, a retaining slot is defined in the flange; the securing member comprises a drawing portion, and the drawing portion is slidably received in the retaining slot; and
   a protrusion is located on the flange and arranged on a middle of the retaining slot; when the securing member is in the first position, the protrusion resists a upper edge of the drawing portion; and
   when the securing member is in the second position, the protrusion resists an lower edge of the drawing portion.

2. The bezel assembly of claim 1, wherein the drawing portion is elastically deformable to disengage from the protrusion and is slidable into the retaining slot.

3. The bezel assembly of claim 1, wherein the securing member further comprises a guide piece and a connecting portion, the connecting portion connects the guide piece and latching piece, and the guide piece is substantially parallel to the latching piece.

4. The bezel assembly of claim 3, wherein the drawing portion is located on the guide piece opposite to the connecting portion, a size of the drawing portion is smaller than a size of the retaining slot, and a size of the guide piece is greater than the size of the retaining slot.

5. The bezel assembly of claim 4, wherein the guiding portion abuts the flange, and is slidable along the flange.

6. The bezel assembly of claim 3, wherein the latching piece comprises a first latch portion, and the cutout is defined in the first latch portion.

7. The bezel assembly of claim 1, wherein the main body defines a sliding way, and the latching piece is slidably received in the sliding way.

8. A bezel assembly comprising:
   a panel, the panel comprising a main body and a flange substantially perpendicularly connected to the main body, the main body defines a through hole and a first opening;
   a shielding member, attached to the panel and comprising a mounting portion; a second opening being defined in the shielding member; and the first opening and the second opening being configured to receive a data storage device extending through and abutting the first opening, and
   a securing member, slidably engaged in the flange and comprising a latching piece; a cutout being defined in the latching piece;
   wherein the securing member is slidable relative to the main body between a first position and a second position; when the securing member is in the first position, the mounting portion extends through the through hole to engage with the latching piece; when the securing member is in the second position, the mounting portion is located on the cutout to disengage from the latching piece;
   a retaining slot is defined in the flange; the securing member comprise a drawing portion, and the drawing portion is slidably received in the retaining slot; and
   a protrusion is located on the flange and arranged on a middle of the retaining slot; when the securing member is in the first position, the protrusion resists a upper edge of the drawing portion; and when the securing member is in the second position, the protrusion resists an lower edge of the drawing portion.

9. The bezel assembly of claim 8, wherein the drawing portion is elastically deformable to disengage from the protrusion and is slidable into the retaining slot.

10. The bezel assembly of claim 8, wherein the securing member further comprises a guide piece and a connecting portion, the connecting portion connects the guide piece and latching piece, and the guide piece is substantially parallel to the latching piece.

11. The bezel assembly of claim 10, wherein the drawing portion is located on the guide piece opposite to the connecting portion, a size of the drawing portion is smaller than a size of the retaining slot, and a size of the guide piece is greater than the size of the retaining slot.

12. The bezel assembly of claim 11, wherein the guiding portion abuts the flange, and is slidable along the flange.

13. The bezel assembly of claim 8, wherein the latching piece comprises a first latch portion, and the cutout is defined in the first latch portion.

14. The bezel assembly of claim 8, wherein the main body defines a sliding way, and the latching piece is slidably received in the sliding way.

* * * * *